US009732893B2

(12) United States Patent
Konishi

(10) Patent No.: US 9,732,893 B2
(45) **Date of Patent: *Aug. 15, 2017**

(54) RAPID-CONNECT COUPLER

(71) Applicant: Engineered Controls International, LLC, Elon, NC (US)

(72) Inventor: Howard M. Konishi, Kirkland, WA (US)

(73) Assignee: Engineered Controls International, LLC, Elon, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/833,762

(22) Filed: Aug. 24, 2015

(65) Prior Publication Data

US 2015/0362111 A1 Dec. 17, 2015

Related U.S. Application Data

(63) Continuation of application No. 13/206,828, filed on Aug. 10, 2011, now Pat. No. 9,115,838.
(Continued)

(51) Int. Cl.
*F16L 37/12* (2006.01)
*F16L 37/096* (2006.01)
(Continued)

(52) U.S. Cl.
CPC ............ *F16L 37/096* (2013.01); *F16L 21/08* (2013.01); *F16L 37/1215* (2013.01);
(Continued)

(58) Field of Classification Search
CPC . F16L 55/07; F16L 37/40; F16L 37/48; F16L 37/08; F16L 37/082; F16L 37/084;
(Continued)

(56) References Cited

U.S. PATENT DOCUMENTS 430,721 A 6/1890 Winkler
2,070,013 A * 2/1937 Krannak ................ F16N 21/04 156/460

(Continued)

FOREIGN PATENT DOCUMENTS

CA 2166844 7/1996
CN 1502839 6/2004

(Continued)

OTHER PUBLICATIONS

International Search Report for PCT/US2011/047282, dated Feb. 28, 2012.

(Continued)

*Primary Examiner* — Mary McManmon
*Assistant Examiner* — David Colon Morales
(74) *Attorney, Agent, or Firm* — Neal, Gerber & Eisenberg LLP

(57) ABSTRACT

A rapid-connect gas coupler is shown and described herein. In an embodiment, the rapid-connect gas coupler includes a spring-loaded probe within a probe cavity, which is defined by a housing and one or more latch segment. The probe can engage with a gas connector, which causes the latch segment to engage and couple with the gas connector.

17 Claims, 10 Drawing Sheets

Related U.S. Application Data

(60) Provisional application No. 61/372,204, filed on Aug. 10, 2010, provisional application No. 61/414,356, filed on Nov. 16, 2010.

(51) Int. Cl.
*F16L 37/23* (2006.01)
*F16L 37/40* (2006.01)
*F16L 21/08* (2006.01)
*F16L 55/07* (2006.01)

(52) U.S. Cl.
CPC ............... *F16L 37/23* (2013.01); *F16L 37/40* (2013.01); *F16L 55/07* (2013.01); *F17C 2205/037* (2013.01); *Y10T 137/7856* (2015.04)

(58) Field of Classification Search
CPC ..... F16L 37/096; F16L 37/1215; F16L 37/12; F16L 21/08; F16L 37/23; F16L 37/22; Y10T 137/87965; Y10T 137/87957; F17C 2205/0335; F17C 2205/0323; F17C 2205/037
USPC ............ 251/149.1, 149, 149.6, 149.7, 149.8, 251/149.9
See application file for complete search history.

(56) References Cited

U.S. PATENT DOCUMENTS 2,259,137 A 10/1941 Iftiger, Sr.
2,327,714 A 8/1943 Iftiger, Sr.
2,388,179 A * 10/1945 Prowd ................. F16L 37/1215 285/315
2,434,167 A * 1/1948 Knoblauch ............. F16L 37/23 251/149.6
2,512,320 A 6/1950 Fischer
2,552,543 A * 5/1951 Earle ....................... F16L 37/23 279/20
2,675,829 A 4/1954 Livers
2,797,110 A 6/1957 Covington
2,904,351 A 9/1959 Gellett et al.
3,069,127 A 12/1962 Perry et al.
3,474,827 A 10/1969 Rosell
3,583,667 A 6/1971 Amneus, Jr.
3,674,051 A 7/1972 Stratman
3,680,591 A 8/1972 Vik
3,710,823 A 1/1973 Vik
3,757,836 A * 9/1973 Masuda ................ F16L 37/121 141/312
3,809,122 A 5/1974 Berg
3,897,091 A 7/1975 McMath et al.
3,913,844 A 10/1975 Petrovic
3,924,654 A * 12/1975 Buller ..................... F16L 37/23 137/322
4,124,228 A 11/1978 Morrison
4,181,150 A 1/1980 Maldavs
4,234,161 A 11/1980 Wilder et al.
4,303,098 A * 12/1981 Shindelar ................ F16L 37/23 137/596.2
4,347,870 A 9/1982 Maldavs
4,366,945 A 1/1983 Blauenstein
4,398,561 A 8/1983 Maldavs
4,541,457 A 9/1985 Blenkush
4,543,995 A * 10/1985 Weh .................... F16L 37/1215 137/614.06
4,552,333 A 11/1985 Niemi
4,676,269 A * 6/1987 Sarson .................... F16L 37/22 137/614.06
4,716,938 A * 1/1988 Weh .................... F16L 37/1215 137/614.06
4,799,512 A 1/1989 Sarson
4,884,830 A 12/1989 Meisinger
5,002,254 A 3/1991 Belisaire et al.
5,046,523 A 9/1991 Horhota
5,074,332 A 12/1991 Jones
5,080,132 A * 1/1992 Manz .................. F16L 37/1215 137/614.04
5,092,364 A 3/1992 Mullins
5,127,428 A 7/1992 Fahl
5,129,621 A 7/1992 Maiville et al.
5,139,049 A * 8/1992 Jensen .................... F16L 37/34 137/614.03
5,161,568 A 11/1992 Turvey
5,205,317 A 4/1993 Neuerberg et al.
5,211,197 A 5/1993 Marrison et al.
5,255,714 A 10/1993 Mullins
5,265,844 A * 11/1993 Westfall .................. F16L 37/40 251/149.1
5,290,009 A 3/1994 Heilmann
5,293,902 A * 3/1994 Lapierie ............ B60H 1/00585 137/614.04
5,301,723 A 4/1994 Goode
5,339,862 A * 8/1994 Haunhorst .............. F16L 37/36 137/614.03
5,363,879 A 11/1994 Rhoades
5,429,155 A 7/1995 Brzyski et al.
5,439,258 A * 8/1995 Yates .................... F16L 37/138 285/313
5,445,358 A 8/1995 Anderson
5,507,530 A 4/1996 Mahaney
5,547,166 A * 8/1996 Engdahl .............. F16L 37/0848 251/149.6
5,564,471 A * 10/1996 Wilder ................ F16L 55/1015 137/614.04
5,575,510 A * 11/1996 Weh .................... F16L 37/1215 285/312
5,577,706 A 11/1996 King
5,580,099 A 12/1996 Eaton
5,603,353 A * 2/1997 Clark ...................... F16L 37/23 137/614.01
5,630,570 A 5/1997 Lacroix et al.
5,649,723 A * 7/1997 Larsson .............. F16L 37/1215 285/322
5,671,777 A 9/1997 Allen et al.
5,706,967 A * 1/1998 Weh ................ B60K 15/03006 220/203.01
5,709,243 A 1/1998 Wells et al.
5,788,443 A 8/1998 Cabahug
5,806,832 A 9/1998 Larbuisson
5,884,648 A 3/1999 Savage
5,896,889 A 4/1999 Menard
5,927,683 A * 7/1999 Weh .................... F16L 37/1215 251/149.6
5,937,885 A 8/1999 Sampson
5,950,679 A * 9/1999 Danielson ........... F16L 37/1215 138/89
5,967,491 A 10/1999 Magnuson et al.
5,984,265 A * 11/1999 Engdahl .................. F16L 37/42 251/148
5,988,697 A * 11/1999 Arosio .................... F16L 37/23 285/124.1
6,035,894 A * 3/2000 Weh .................... F16L 37/1215 137/614.05
6,039,303 A * 3/2000 Danielson ............. F16L 37/413 137/614.03
6,056,010 A 5/2000 Wells
6,073,971 A * 6/2000 Weh .................... F16L 37/1215 285/101
6,073,974 A 6/2000 Meisinger et al.
6,082,399 A * 7/2000 Nyberg .................. F16L 37/23 137/614.03
6,152,496 A * 11/2000 Kouda .................... F16L 37/23 285/316
6,155,294 A 12/2000 Cornford et al.
6,202,692 B1 3/2001 Schumacher
6,257,278 B1 7/2001 Danielson et al.
6,279,874 B1 * 8/2001 Nyberg ................. F16L 37/121 137/614.03
6,343,630 B1 * 2/2002 Dubinsky ........... F16L 37/0848 137/614.05

(56) References Cited

U.S. PATENT DOCUMENTS

| | | | | |
|---|---|---|---|---|
| 6,375,152 | B1 * | 4/2002 | Weh | F16L 37/1215 251/149.6 |
| 6,398,268 | B1 * | 6/2002 | Takahashi | F16L 37/1235 285/305 |
| 6,408,880 | B1 | 6/2002 | Kaul | |
| 6,412,828 | B1 | 7/2002 | Lacroix et al. | |
| 6,499,719 | B1 | 12/2002 | Clancy et al. | |
| 6,637,460 | B2 * | 10/2003 | Haunhorst | F16L 37/23 137/614.03 |
| 6,705,550 | B2 | 3/2004 | Bell | |
| 6,945,477 | B2 | 9/2005 | Lambert et al. | |
| 7,040,358 | B2 | 5/2006 | Lacroix et al. | |
| 7,073,773 | B2 * | 7/2006 | Nuttall | F16L 37/0848 137/614.03 |
| 7,497,231 | B2 | 3/2009 | Sasa | |
| 7,568,737 | B2 | 8/2009 | Wells et al. | |
| 7,841,580 | B2 | 11/2010 | Konishi et al. | |
| 9,115,838 | B2 * | 8/2015 | Konishi | F16L 37/23 |
| 2003/0085574 | A1 | 5/2003 | Froment et al. | |
| 2004/0094956 | A1 | 5/2004 | Lacroix et al. | |
| 2007/0001143 | A1 * | 1/2007 | Konishi | F16L 37/40 251/149.8 |
| 2007/0235092 | A1 | 10/2007 | Danielson et al. | |
| 2008/0011369 | A1 * | 1/2008 | Matsumoto | F16L 37/40 137/614.05 |
| 2008/0128034 | A1 | 6/2008 | Fahl | |
| 2008/0185837 | A1 * | 8/2008 | Danielson | F16L 37/0848 285/86 |
| 2008/0265574 | A1 | 10/2008 | Tiberghien et al. | |
| 2009/0140519 | A1 | 6/2009 | Pavnaskar et al. | |
| 2009/0165870 | A1 | 7/2009 | Konishi | |
| 2009/0205722 | A1 | 8/2009 | Sledz | |
| 2010/0127198 | A1 | 5/2010 | Cozza | |
| 2010/0148499 | A1 * | 6/2010 | Le Quere | F16L 37/1215 285/310 |
| 2011/0005639 | A1 | 1/2011 | Weh et al. | |
| 2011/0186176 | A1 | 8/2011 | Aehle et al. | |

FOREIGN PATENT DOCUMENTS

| | | |
|---|---|---|
| CN | 1608910 A | 4/2005 |
| CN | 101946113 | 1/2011 |
| EP | 0039977 | 11/1981 |
| WO | WO8001711 | 8/1980 |

OTHER PUBLICATIONS

Office Action for Chinese Patent Application No. 2011800489135, dated Mar. 19, 2014.

Office Action for Chinese Patent Application No. 2011800489135, dated Nov. 26, 2014.

* cited by examiner

RAPID-CONNECT COUPLER

PRIORITY CLAIM

This application is a continuation of U.S. patent application Ser. No. 13/206,828, filed Aug. 10, 2011, which claims the benefit of U.S. Provisional Patent Application No. 61/372,204, filed on Aug. 10, 2010, and U.S. Provisional Patent Application No. 61/414,356, filed on Nov. 16, 2010, all of which applications are incorporated herein by reference in their entireties for all purposes.

TECHNICAL FIELD

This disclosure relates generally to gas couplings, and more specifically to rapid-connect gas couplers.

BACKGROUND

An ordinary cylinder used to hold a gas under pressure may include a threaded socket inlet which leads to a check valve that is held in closed position by the pressure of the gas inside the cylinder.

Whenever a gas cylinder is to be charged with gas under pressure, it is necessary to tightly screw a fitting into or on a threaded socket inlet of the gas cylinder in order to connect the gas cylinder inlet to a supply of gas under pressure. The operation of screwing a fitting into the threaded socket inlet of a gas cylinder is time-consuming and therefore undesirable when filling a large number of gas cylinders in a manufacturing plant or at a refilling station. For example, two steps of operation are required to make a connection with most couplers, which substantially increases the time and cost of cylinder refilling. Moreover, the repetitive motion of twisting the wrist can lead to carpal-tunnel syndrome or the like, which can be detrimental to the operators of a refilling station.

Although rapid-connect couplers exist for filling a gas cylinder, these couplers are deficient because they fail to consistently provide an airtight seal with the cylinder. Accordingly, filling gas cylinders can be inefficient because of the time it takes to properly seat the coupler, and the fact that improper seating often goes unnoticed, which also results in wasted time.

Additionally, existing rapid-connect couplers are also deficient because they are typically unable to adapt to more than one type of socket inlet. For example, some socket inlets may have a check valve which must be actuated for gas to flow through the valve, and such a check valve may be located in various locations and be associated with various diameters of inlet channels. Other socket inlets may not have a check valve. Existing rapid-connect couplers are not able couple with many types of inlets and are not re-configurable. A new coupler is typically required for each type of inlet.

BRIEF DESCRIPTION OF THE DRAWINGS

The present subject matter disclosure will be described by way of exemplary embodiments but not limitations, illustrated in the accompanying drawings in which like references denote similar elements, and in which.

DETAILED DESCRIPTION

Illustrative embodiments presented herein include, but are not limited to, systems and methods for providing a rapid-connect gas coupler.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Figure 1:
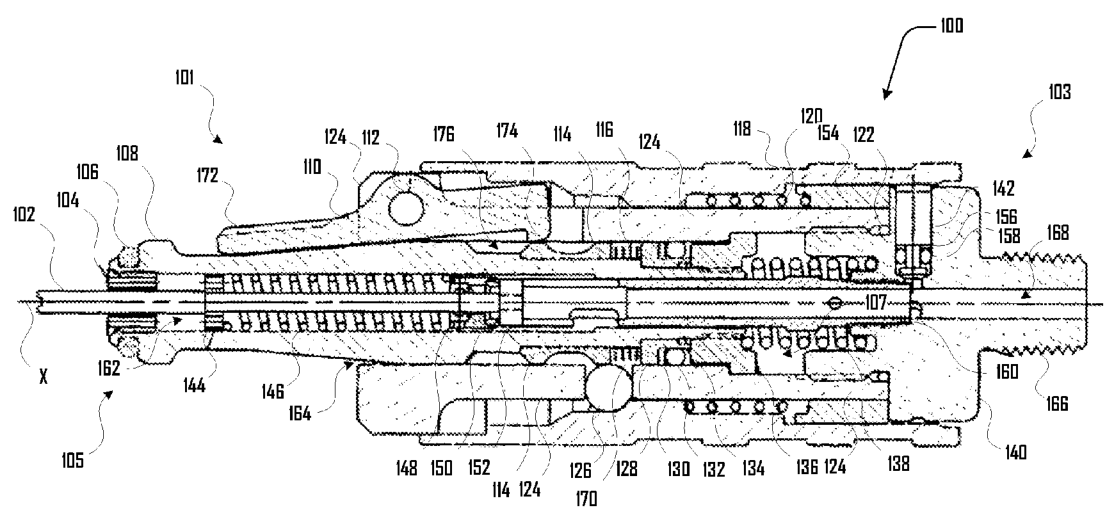
FIG. 1 is a cross section of a rapid-connect coupler in a first configuration in accordance with an embodiment.
Figure 4:
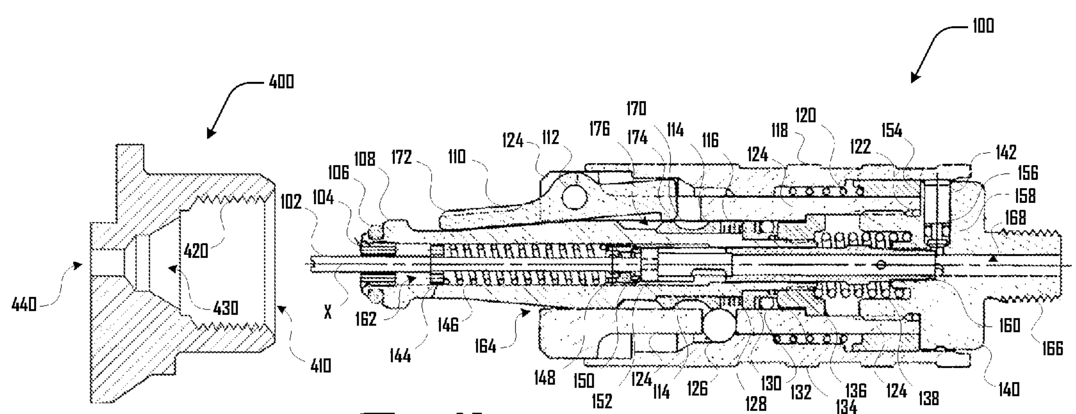
FIG. 4 is a cross section of a rapid-connect coupler and a cross section of a gas connector in accordance with the embodiment of FIG. 1.
Figure 5:
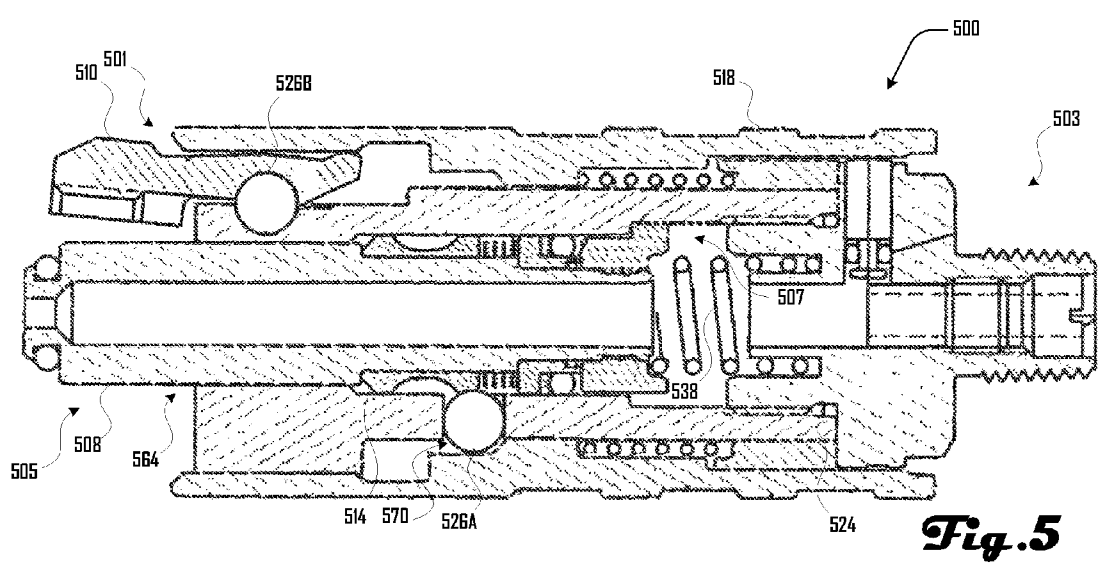
FIG. 5 is a cross section of a rapid-connect coupler in a first configuration in accordance with another embodiment.

A rapid-connect gas coupler 100, 500 is shown and described herein (e.g., FIGS. 1 and 5). In an embodiment, the rapid-connect gas coupler 100, 500 includes a spring-loaded probe 108, 508 within a probe cavity 164, 564 which is defined by a housing 124, 524 and one or more latch segment 110, 510. The probe 108, 508 can engage with a gas connector 400, 800 (FIGS. 4 and 8), which causes the latch segment 110, 510 to engage and couple with the gas connector 400, 800 as discussed herein.

For example, in one or more embodiment, the rapid-connect gas coupler 100, 500 may include an elongated housing 124, 524 having a first-housing end 101, 501 and a second-housing end 103, 503, and defining a probe cavity 164, 564. The rapid-connect gas coupler 100, 500 may also include an elongated probe 108, 508 having a first-probe end 105, 505 and a second-probe end 107, 507 and slidably residing within the probe cavity 164, 564 at the first-housing end 103, 503 with the first-probe end 105, 505 extending from the probe cavity 164, 564. The rapid-connect gas coupler 100, 500 may also include an elongated fluid passageway 162, 562 defined by the probe 108, 508 and housing 124, 524 and communicating between the first-probe end 105, 505 and the second-housing end 103, 503. The rapid-connect gas coupler 100, 500 may include one or more latch segments 110, 510 pivotally coupled to the first-housing end 101, 501 and an elongated sleeve 118, 518 slidably residing about the housing 124, 524, probe 108, 508 and one or more latch segments 110, 510.

Some embodiments may comprise an elongated check-valve-actuating apparatus 102, 910, disposed within a portion of the fluid passageway and extending from the first-probe end 105, 505.

Some embodiments may include an elongated housing 124, 524 having a substantially cylindrical first-housing end 101, 501 and a second-housing end 103, 503 and defining a probe cavity 164, 564. Some embodiments may also include an elongated and substantially cylindrical probe 108, 508 having a first-probe end 105, 505 and a second-probe end 107, 507 and slidably residing within the probe cavity 164, 564 at the first-housing end 101, 501 with the first-probe end 105, 505 extending from the probe cavity 164, 564. Some embodiments may include one or more latch segments 110, 510 pivotally coupled about the first-housing end 101, 501 circumference and fixed in position and inoperable to translate about the first-housing end 101, 501 circumference.

Some embodiments may include a biased ball cam 114, 514 surrounding a portion of the probe 108, 508 within the probe cavity 164, 564. The ball cam 114, 514 may be slidably biased along the length of the probe 108, 508 toward the probe first end 105, 505. Some embodiments may include a ball cavity 170, 570 defined by a portion of the sleeve 118, 518 and a portion of the housing 124, 524 with a ball 126, 526 disposed in the ball cavity 170, 570. The probe 108, 508 may be configured to slide longitudinally within the probe cavity 164, 564 from a resting position to a coupling position where the ball cam 114, 514 is misaligned with the ball cavity 170, 570 and ball 126, 526 in the resting position and where the ball cam 114, 514 is aligned with the ball cavity 170, 570 and ball 126, 526 in the resting coupling position.

Figure 2:
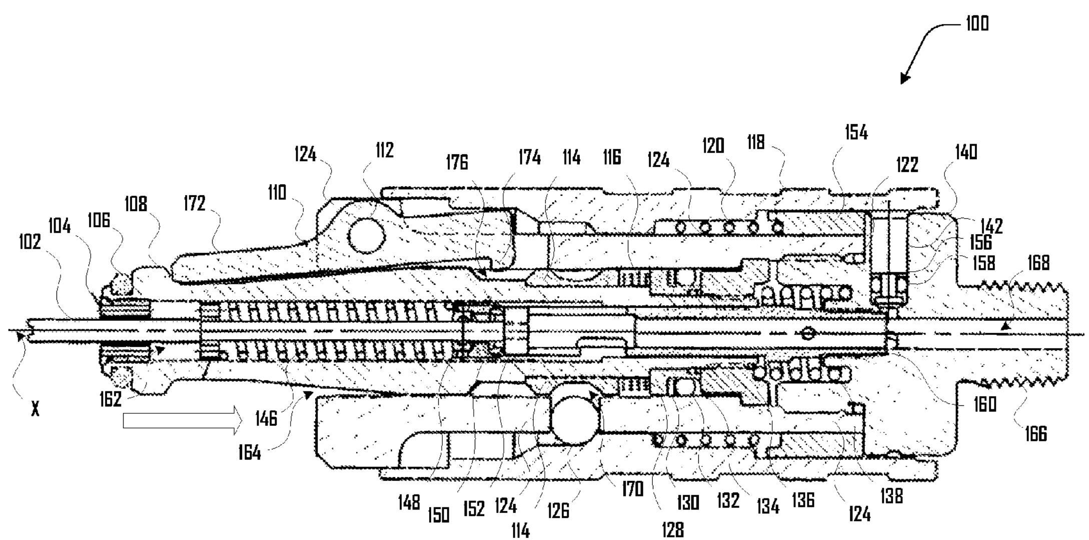
FIG. 2 is a cross section of the rapid-connect coupler in a second configuration in accordance with the embodiment of FIG. 1.
Figure 3:
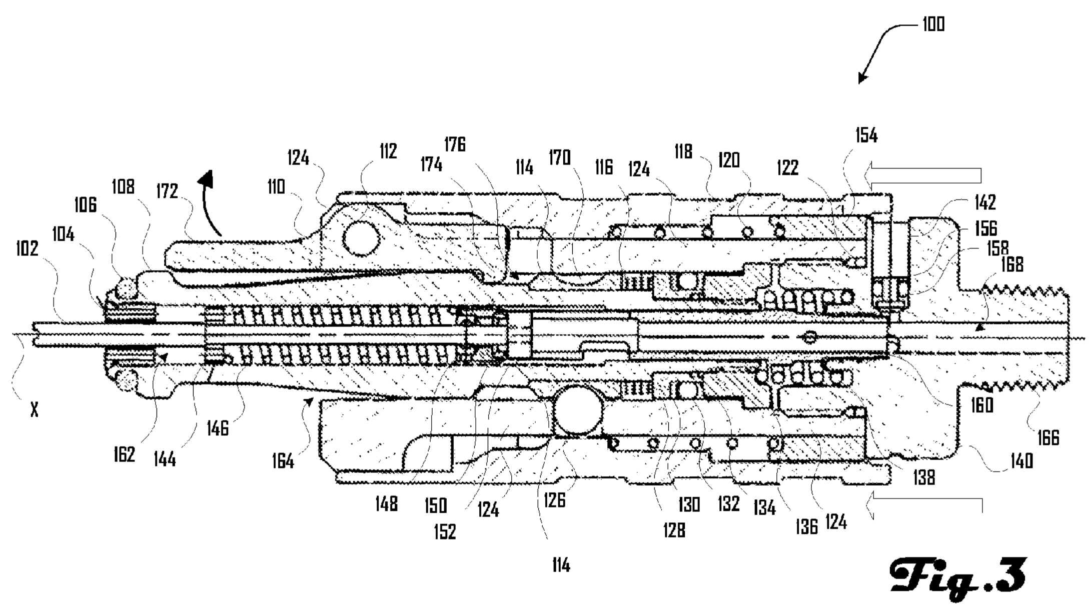
FIG. 3 is a cross section of the rapid-connect coupler in a third configuration in accordance with the embodiment of FIG. 1.

FIGS. 1-4 depict a rapid-connect coupler 100 in accordance with an embodiment, which may be operable to couple with a gas connector 400 (FIG. 4). FIG. 1 depicts the rapid-connect coupler 100 in a first configuration, which may be a resting configuration before the rapid-connect coupler 100 couples with a gas connector 400. FIGS. 2 and 3 depict the rapid-connect coupler 100 in second and third configurations, which may represent configuration that the rapid-connect coupler 100 assumes when coupling with or when coupled to a gas connector 400.

As shown in FIGS. 1-4, the rapid-connect coupler 100 comprises a probe 108, which is an elongated member that extends from the front end of the rapid-connect coupler 100 and resides within a probe cavity 164. Probe packing 106 is present at the front end of the probe 108. The probe 108 defines a cylindrical tip cavity 162, which extends through the probe 108 along a central axis X.

A tip 102 resides within the tip cavity 162 extending down the central axis X, and is supported by a front guide 104, and a pad spring 148. The tip 102 is further associated with a washer 144, a tip spring 146, and a pad spring 148, which makes the tip 102 spring-loaded within the tip cavity 162 along the central axis X.

The probe 108 comprises a first and second probe end 105, 107 and resides within the probe cavity 164, which is defined by a housing 124, and a latch segment 110, which is coupled to the housing 124, via at least one latch pin 112. The latch segment 110 comprises a latch nose 172, and a latch lip 174.

In various embodiments, there may be a plurality of latch segments 110. For example, there may be a first, second, and third latch segment 110 positioned within the housing 124. In some embodiments, there may be any suitable number of latch segments 110. Latch segments 110 may be positioned around the circumference of the probe 108 and may facilitate coupling of the rapid-connect coupler 100 with a gas connector 400 (FIG. 4).

The probe 108 further comprises a cam spring 116, a seat 128, a backup ring 130, rear-probe packing 132, lock-ring packing 134, and a lock ring 136.

Additionally, the rear end of the probe 108 slidably surrounds a tube 160 and contacts a terminal-probe spring 138. Given that the probe 108 slidably resides within the probe cavity 164 and about the tube 160, the probe 108 is thereby spring-loaded within the probe cavity 164. The rear 103 of the rapid-connect coupler 100 is defined by an end fitting 140, which houses the tube 160 and supports the terminal-probe spring 138. End fitting packing 122 also resides between the housing 124 and the end fitting 140. The end fitting 140 also includes a plunger 142, which comprises plunger packing 158 and a plunger-backup ring 156.

The end fitting 140 further comprises an end fitting cavity 168, which extends along the central axis X and through a terminal coupler 166. As depicted herein, the terminal coupler 166 comprises a threaded extension, which allows complementary threaded components (not shown) to couple with the terminal coupler 166. However, in various embodiments, the terminal coupler may be any suitable, shape, configuration or size, depending on the hardware that is desired to be coupled to the rapid-connect coupler 100 via the terminal coupler 166.

Furthermore, slidably surrounding portions of the housing 124, end fitting 140 and latch segment 110 is a sleeve 118. The sleeve 118 contacts a sleeve spring 120, and the sleeve spring 120 also contact a spring pad 154. Accordingly, the sleeve 118 is spring-loaded about the housing 124, end fitting 140 and latch segment 110.

Additionally, a ball 126 resides within a ball cavity 170 within the probe cavity 164, which is defined by the housing 124 and the sleeve 118. As shown and described herein, the ball 126 may contact a ball cam 114 in various configurations, which is positioned on the probe 108. Additionally, in various embodiments, the sleeve 118 may be held in the configuration depicted in FIG. 1 by the ball 126, and tension of the sleeve spring 120 pushes the sleeve 118 against the ball 126.

Referring now to FIG. 2, the rapid-connect coupler 100 is depicted in a second configuration wherein the probe 108 is pushed back into the probe cavity 164. For example, in an embodiment, the probe 108 may be inserted into a gas connector 400 (FIG. 4) and the force of insertion causes the probe 108 to compress the terminal probe spring 138, which allows the probe 108 to shift further into the probe cavity 164 as depicted in FIG. 2.

The movement of the probe 108 into the probe cavity 164 causes the ball cam 114 to move into position over the ball cavity 170 and the ball 126. Additionally, a latch lip notch 176 on the probe 138 shifts into position under the latch lip 174.

Referring now to FIG. 3, the rapid-connect coupler 100 is depicted in a third configuration wherein the probe 108 is pushed back into the probe cavity 164, the sleeve 118 shifts forward, and the latch segment 110 rotates into the latch-lip notch 176. In various embodiments, the third configuration occurs subsequent to the second configuration depicted in FIG. 2.

In the third configuration depicted in FIG. 3, the ball 126 shifts into the ball cavity 170, which allows the sleeve 118, which may be under tension of the sleeve spring 120, to shift forward. Such forward movement of the sleeve 118 forces the latch lip 174 of the latch segment 110 into the latch-lip notch 176, which causes the latch segment 110 to rotate about the pin 112. Accordingly, the latch nose 172 rotates away from the probe 108 and is held in position by the sleeve 118.

FIG. 4 depicts a rapid-connect coupler 100 and a gas connector 400 in accordance with an embodiment. The gas connector 400 depicted in FIG. 4 is a CGA 580 port; however, in various embodiments, a rapid-connect coupler 100 may be adapted or operable to couple with various CGA ports, or other ports having a cavity. Such ports may or may not include threads.

Referring to FIG. 4, the gas connector 400 defines a front, middle and rear cavity 410, 430, and 440 and includes threads 420 in the front cavity 410. In an embodiment, the rapid-connect coupler 100 is operable to couple with the gas connector 400 when the rapid-connect coupler 100 is inserted into the gas connector 400.

For example, the probe 108 is inserted into the gas connector 400, and a front portion of the probe 108 corresponds to the middle cavity 430, and the tip 102 corresponds to the rear cavity 440. The front portion of the probe 108 and the probe packing 106 may engage a portion of the middle cavity 430 and the tip 102 may enter the rear cavity 440. The engagement of the probe 108 with the middle cavity 430 allows the probe 108 to be pushed back into the probe cavity 164, which may cause the rapid-connect coupler 100 to assume the second configuration depicted in FIG. 2 and then the third configuration depicted in FIG. 3. When the rapid-connect coupler 100 assumes the third configuration as depicted in FIG. 3, the latch segment 110 (or the plurality of latch segments 110) rotate to engage the threaded portion 420. The rapid-connect coupler 100 is thereby held and coupled within the gas connector 400 and forms a seal therewith such that gas may be transferred through the gas connector 400 and the rapid-connect coupler 100.

In an embodiment, the ball cam 114 may be biased by the cam spring 116. A biased ball cam 114 may be desirable in some embodiments because it may provide for improved seating and coupling of the probe 180 within a gas connector 400. The biased ball cam 114 may prevent a gap from remaining between the probe front end 105 and the middle cavity 430 of the gas connector 400. Having a biased ball cam 114 may allow the probe 108 to move forward under pressure of gas within the fluid passageway 168 and thereby naturally find and maintain a tight fit within the gas connector 400. Additionally, the biased ball cam 114 may provide for positive radial placement of the latch segments 110, which may or may not comprise threads.

In some embodiments, the latch nose 172 may comprise threads, which correspond to the threaded portion 420 of the gas connector 400, or which may engage a portion of the gas connector 400 regardless of whether the gas connector 400 comprises threads or not.

Additionally, in various embodiments, the tip 102 may be configured to actuate a check-valve or residual pressure valve within the gas connector 400 (e.g., within the third cavity 440). Accordingly, in various embodiments, the tip 102 may be configured in various ways to correspond to a check-valve or other structure within the gas connector 400. However, in some embodiments, the tip 102 may be absent.

The components of the rapid-connect coupler 100 may be made of any suitable material. For example, suitable materials may include, but not be limited to corrosion resistant steel, brass, or the like. Other suitable materials for various components may include nitrile butadiene rubber, Polytetrafluoroethylene, or the like.

In various embodiments the rapid-connect coupler 100 may be part of a gas cylinder charging system. For example, a rapid-connect coupler 100 may be attached to a tube or hose, which is connected to a pressurized gas source. In some embodiments, a plurality of rapid-connect couplers 100 may be coupled to the pressurized gas source. In such embodiments, pressurized gas cylinders may be rapidly charged either alone or as a group by coupling the one or more rapid-connect couplers 100 to the fill-port of each cylinder and charging the tanks via the pressurized gas source.

Figure 6:
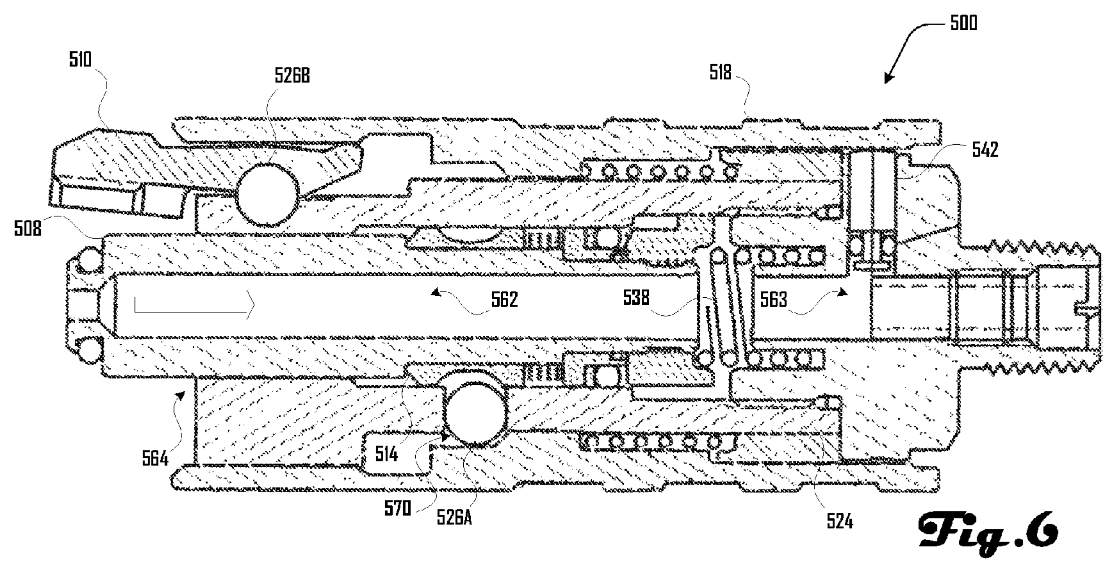
FIG. 6 is a cross section of the rapid-connect coupler in a second configuration in accordance with the embodiment of FIG. 5.
Figure 7:
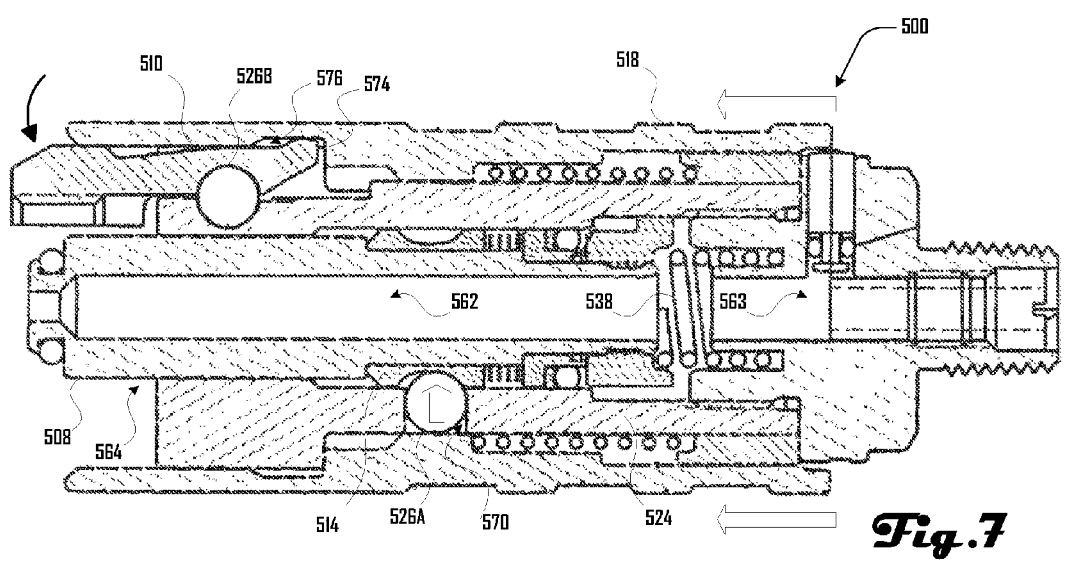
FIG. 7 is a cross section of the rapid-connect coupler in a third configuration in accordance with an embodiment of FIG. 5.
Figure 8:
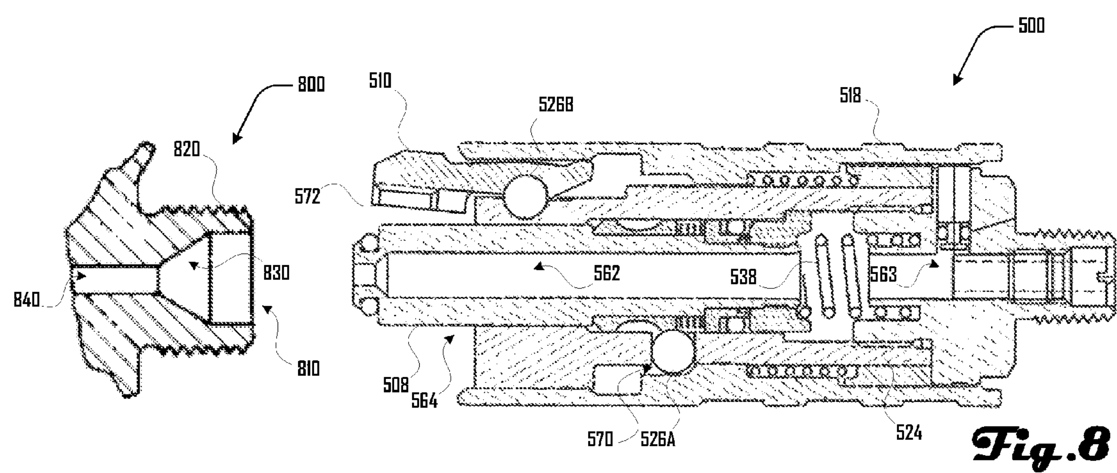
FIG. 8 is a cross section of a rapid-connect coupler and a cross section of a gas connector in accordance with an embodiment of FIG. 5.
Figure 9A:
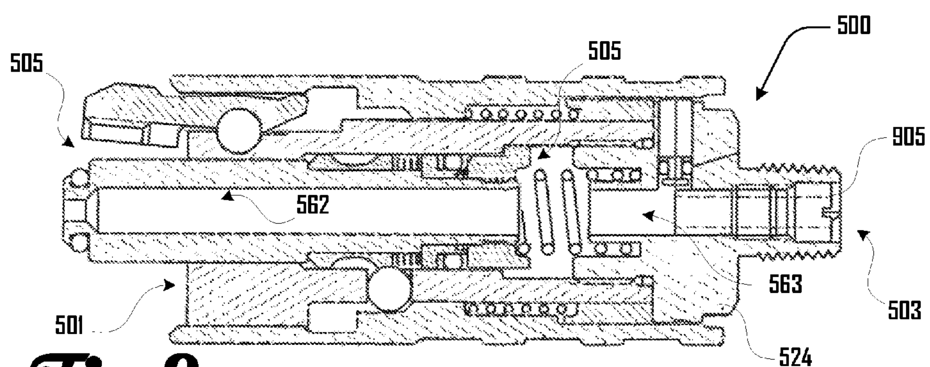
FIGS. 9*a* and 9*b* depict a cross section of the rapid-connect coupler of FIGS. 5-8 with a removable plug in accordance with an embodiment.
Figure 9B:
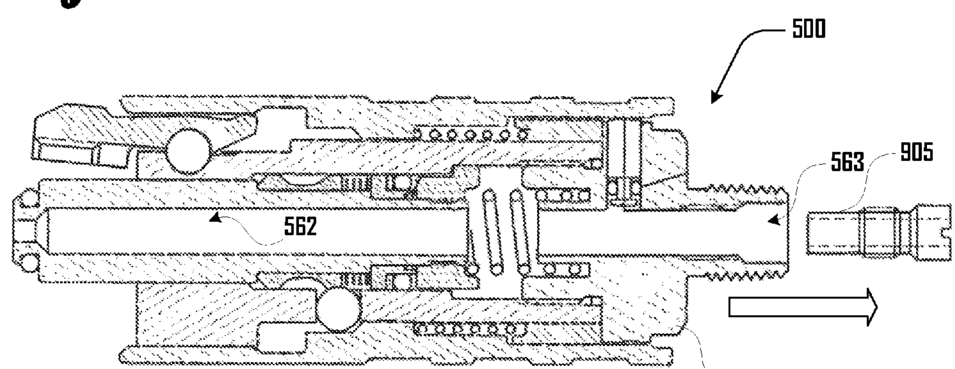
Figure 9C:
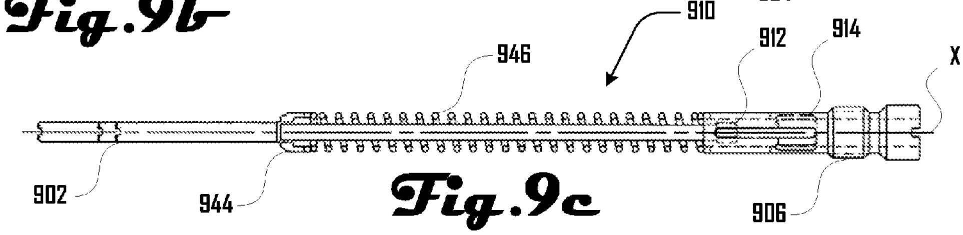
FIG. 9*c* depicts a cross section of a replaceable actuator assembly, in accordance with an embodiment.
Figure 9D:
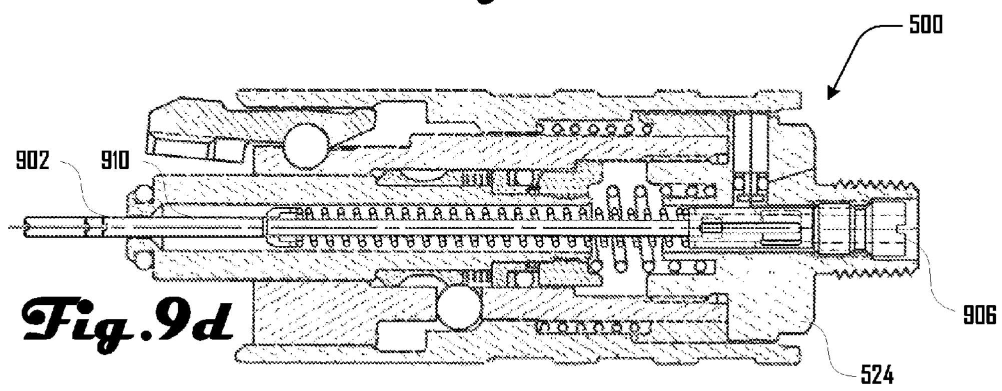
FIG. 9*d* depicts a cross section of the replaceable actuator assembly of FIG. 9*c* residing within the rapid-connect coupler of FIGS. 5-8 in accordance with an embodiment.

FIGS. 5-8 depict a rapid-connect coupler 500 in accordance with another embodiment, which may be operable to couple with a gas connector 800 (FIG. 8). The rapid-connect coupler 100 depicted in FIGS. 1-4 may be considered a "male" coupler embodiment, as it couples within a gas connector 400, and the rapid-connect coupler 500 depicted in FIGS. 5-8 may be considered a "female" coupler embodiment, as it couples to the exterior of a gas connector 800.

FIG. 5 depicts the rapid-connect coupler 500 in a first configuration, which may be a resting configuration before the rapid-connect coupler 500 couples with a gas connector 800. FIGS. 6 and 7 depict the rapid-connect coupler 500 in second and third configurations, which may represent configurations that the rapid-connect coupler 500 assumes when coupling with or when coupled to a gas connector 800.

As shown in FIGS. 5-8, the rapid-connect coupler 500 comprises a probe 508, which is an elongated member that extends from the front end 501 of the rapid-connect coupler 500 and resides within a probe cavity 564. The probe cavity 564 is defined by a housing 524, and a latch segment 510.

The latch segment 510 resides between the housing 524 and a sleeve 518, and is configured to rotate about a latch bearing 526B as shown and described herein. In various embodiments, there may be a plurality of latch segments 510. For example, there may be a first, second, and third latch segment 510 positioned within the housing 524. In some embodiments, there may be any suitable number of latch segments 510. Latch segments 510 may be positioned around the circumference of the probe 508 and may facilitate coupling of the rapid-connect coupler 500 with a gas connector 800 (FIG. 8).

Referring now to FIG. 6, the rapid-connect coupler 500 is depicted in a second configuration wherein the probe 508 is pushed back into the probe cavity 564. For example, in an embodiment, the probe 508 may be inserted into a gas connector 800 (FIG. 8) and the force of insertion causes the probe 508 to compress a terminal probe spring 538, which allows the probe 508 to shift further into the probe cavity 564 as depicted in FIG. 6.

The movement of the probe 508 into the probe cavity 564 causes the ball cam 514 to move into position over the ball cavity 570 and the ball 526A.

Referring now to FIG. 7, the rapid-connect coupler 500 is depicted in a third configuration wherein the probe 508 is pushed back into the probe cavity 564, the sleeve 518 shifts forward, and the latch segment 510 rotates toward the probe 508. In various embodiments, the third configuration occurs subsequent to the second configuration depicted in FIG. 6.

In the third configuration depicted in FIG. 7, the ball 526A shifts into the ball cavity 570, which allows the sleeve 518, which may be under tension, to shift forward. Such forward movement of the sleeve 518 forces a latch lip 574 of the latch segment 510 into a latch-lip notch 576 defined by the sleeve 518, which causes the latch segment 510 to rotate about the latch bearing 526B. Accordingly, latch segment 510 rotates toward the probe 508 and is held in position by the sleeve 518.

FIG. 8 depicts a rapid-connect coupler 500 and a gas connector 800 in accordance with an embodiment. The gas connector 800 depicted in FIG. 8 is a CGA 540 port; however, in various embodiments, a rapid-connect coupler 500 may be adapted or be operable to couple with various CGA ports, or other ports having a cavity. Such ports may or may not include threads externally or internally.

Referring to FIG. 8, the gas connector 800 defines a front, middle and rear cavity 810, 830, and 840 and includes threads 820 externally. In an embodiment, the rapid-connect coupler 500 is operable to couple with the gas connector 800 when the rapid-connect coupler 500 is inserted into the gas connector 800.

For example, the probe 508 is inserted into the gas connector 800, and the probe 508 corresponds to one or more cavity 810, 830, and 840. The engagement of the probe 508 with the gas connector 800 allows the probe 508 to be pushed back into the probe cavity 564, which may cause the rapid-connect coupler 500 to assume the second configuration depicted in FIG. 6 and then the third configuration depicted in FIG. 7. When the rapid-connect coupler 500 assumes the third configuration as depicted in FIG. 7, the latch segment 510 (or the plurality of latch segments 510) rotate to engage the threaded portion 820. The rapid-connect coupler 500 is thereby held and coupled within the gas connector 800 and forms a seal therewith such that gas may be transferred through the gas connector 800 and the rapid-connect coupler 500.

In some embodiments, the latch segment 510 may comprise threads, which correspond to the threaded portion 820 of the gas connector 800, or which may engage a portion of the gas connector 800 regardless of whether the gas connector 800 comprises threads or not.

Additionally, in various embodiments, the probe 508 may be configured to actuate a check-valve or residual pressure valve within the gas connector 800 (e.g., within the probe 108 as depicted in FIGS. 1-4). Accordingly, in various embodiments, the probe 508 may be configured in various ways to correspond to a check-valve or other structure within the gas connector 800.

FIGS. 9 *a* and 9 *b* depict the rapid-connect coupler 500 of FIGS. 5-8 with a removable plug 905 in accordance with an embodiment. The plug 905 may be removably disposed within the fluid passageway 562 at the second housing end 503. For example, FIG. 9 *a* depicts a plug 905 disposed within the second housing end 503 within a plug orifice 563 and FIG. 9 *b* depicts the plug 905 removed from the plug orifice 563.

FIG. 9 *c* depicts a replaceable actuator assembly 910, in accordance with an embodiment. The actuator assembly 910 comprises a tip 902, a spring pad 944, and a spring 946. The tip 902 slidably resides within an actuator-plug 906 and is biased by the spring 946. The tip 902 may also comprise a bayonet guide 912, which moves within a guide-slot 915 defined by the actuator-plug 906. In some embodiments an actuator assembly 910 may comprise a separate actuator-plug 906 or the actuator-plug 906 may be in integral part of the actuator assembly 910.

In an embodiment, the actuator assembly 910 may be removably disposed within the plug orifice 563 and/or the fluid passageway 562 as depicted in FIG. 9 *d*. For example, the plug 905 may be removed from the second housing end 503 and the actuator assembly 910 may be inserted into the second housing end 503. The actuator-plug 906 may correspond to the plug 905 and may couple the actuator assembly 910 within a portion of the fluid passageway 562. The tip 902 may extend from the first-probe end 505 and be operable to actuate a check valve in a gas connector 800, 400 (FIGS. 4 and 8) as described herein. The tip 902 may be biased and operable to retract within the probe first end 905.

The tip 902 may be operable to be locked in a retracted position within the probe first end 905. For example, this may be desirable in an embodiment because the rapid-connect coupler 500 may be easily and quickly adapted for use with a gas connector 800, 400 with or without a check valve. Such a gas connector 800, 400 and check valve may be part of a CGA gas coupler.

When the rapid-connect coupler 500 is used with gas connector 800, 400 having a check valve, the tip 902 may be configured in an extended position (e.g., FIG. 9 *d*). However, when the rapid-connect coupler 500 is used with a gas connector 800, 400 that does not have a check valve, the tip 902 may be configured in a locked refracted position wherein a portion of the tip 902 is within the first probe end 905 compared to the extended position. The tip 902 may be locked in the retracted position by pushing the tip 902 within the first probe end 905, and may be unlocked by again pushing the tip 902.

Figure 10A:
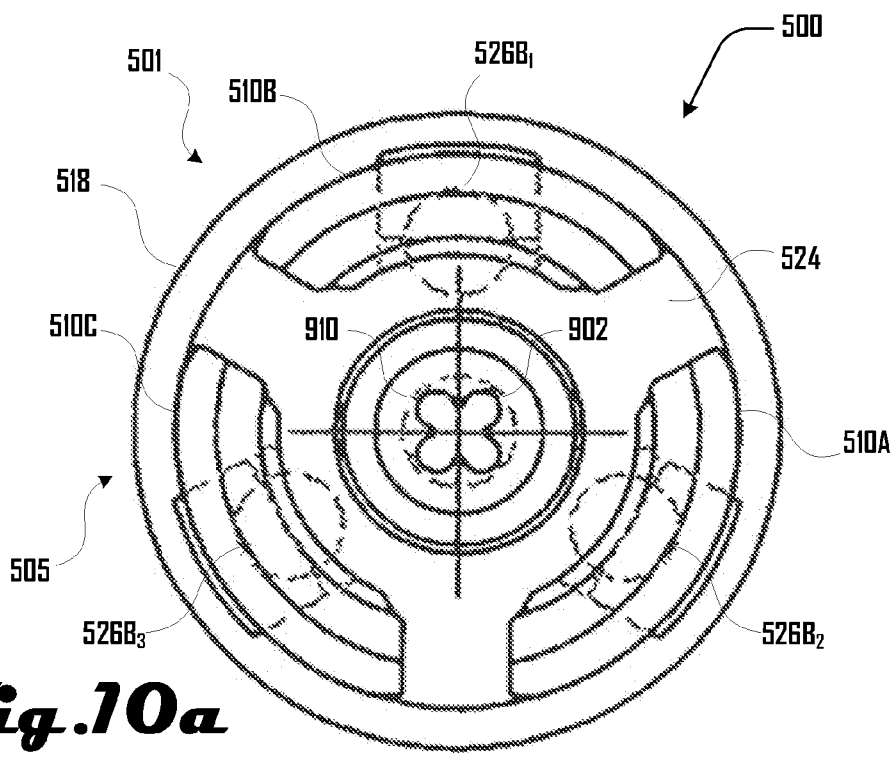
FIG. 10*a* depicts a front end of the rapid-connect coupler of FIGS. 5-8 in accordance with an embodiment.
Figure 10B:
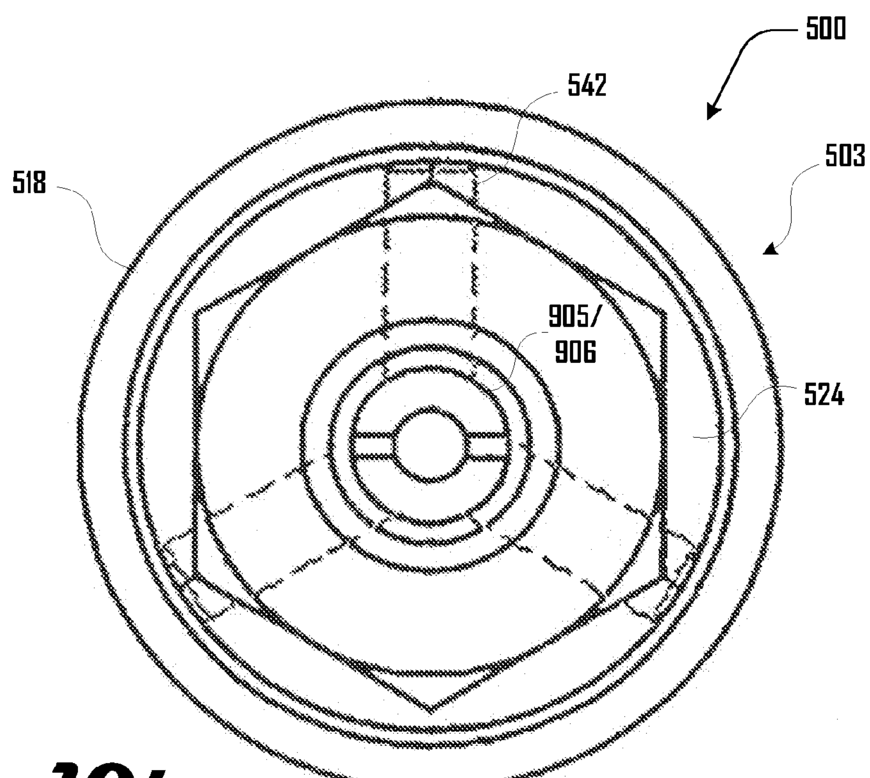
FIG. 10*b* depicts a rear end of the rapid-connect coupler of FIGS. 5-8 in accordance with an embodiment.

FIG. 10 *a* depicts a rapid-connect coupler 500 of FIGS. 5-8 in accordance with an embodiment. The housing 524 may have a substantially cylindrical first-housing end 501 and substantially cylindrical probe 508 having a first-probe end 505 slidably residing within the probe cavity 564 at the first-housing end 501 with the first-probe end 505 extending from the probe cavity 564. The rapid-connect coupler 500 may include three latch segments 510A, 510B, 510C that define a substantially contiguous circumference about the first probe end 505. The latch segments 510A, 510B, 510C may be pivotally coupled about the first housing end 505 circumference via a latch bearing 526$B_1$, 526$B_2$, 526$B_3$ respectively, and may be fixed in position and inoperable to translate about the first-housing end 505 circumference.

For example, having three latch segments 510A, 510B, 510C that are fixed in position and inoperable to translate about the first-housing end 505 circumference may be desirable because it provides three points of solid contact with a gas connector 800, 400 that the rapid-connect coupler 500 may couple with. Lack of mobility of the three latch segments 510A, 510B, 510C may allow the improved alignment with respective threads on the latch segments 510A, 510B, 510C and gas connector 800, 400, which may result in an improved connecting between the rapid-connect coupler 500 and gas connector 800, 400.

FIG. 10 *b* depicts a rear end 503 of the rapid-connect coupler 500 of FIGS. 5-8 in accordance with an embodiment, which may include a plug 905 or an actuator plug 906 of an actuator apparatus 910.

Additionally, although specific embodiments have been illustrated and described herein, it will be appreciated by those of ordinary skill in the art and others, that a wide variety of alternate and/or equivalent implementations may be substituted for the specific embodiment shown and described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

What is claimed is:

1. A rapid-connect coupling apparatus for coupling a fuel source coupling to a fuel tank receiving connector, comprising:

a housing defining, at least in part, a probe cavity;

a probe configured to translate within the probe cavity;

a latch assembly pivotably coupled to the housing, wherein the latch assembly is configured to pivot about a pivot point with respect to the housing based on a translation of the probe within the probe cavity, wherein the latch assembly comprises a latch segment, and a first latch end of the latch assembly is a first end of the latch segment;

wherein the latch segment comprises a second latch end configured to engage a notch portion of the probe as the probe translates within the probe cavity, the probe comprises one or more inner surfaces that define at least a portion of a fluid passageway, and the notch portion of the probe is fixed with respect to the one or more inner surfaces; and a sleeve configured to cause the first latch end of the latch assembly to pivot and disengage from the probe as the sleeve translates about the housing.

2. The rapid-connect coupling apparatus of claim 1, wherein the latch assembly is configured to engage a first surface of the probe and the first surface of the probe is static with respect to the one or more inner surfaces of the probe that define the fluid passageway.

3. The rapid-connect coupling apparatus of claim 1, wherein the first end of the latch segment comprises a threaded portion.

4. A rapid-connect coupling apparatus for coupling a fuel source coupling to a fuel tank receiving connector, comprising:

a housing defining, at least in part, a probe cavity;

a probe configured to translate within the probe cavity;

a latch assembly pivotably coupled to the housing, wherein the latch assembly is configured to pivot about a pivot point with respect to the housing based on a translation of the probe within the probe cavity; and a sleeve configured to cause a first latch end of the latch assembly to pivot and disengage from the probe as the sleeve translates about the housing, wherein the latch assembly comprises a latch segment and a pin extending through the latch segment and the housing.

5. The rapid-connect coupling apparatus of claim 4, wherein the latch assembly comprises a first latch segment, the first latch segment is configured to pivot about the pivot point, the rapid-connect coupling apparatus further comprises a plurality of second latch segments, and the plurality of second latch segments are each configured to pivot about respective second pivot points.

6. The rapid-connect coupling apparatus of claim 4, further comprising a plurality of latch segments, each latch segment including a first end configured to contact the probe when the rapid-connect coupling apparatus is in a non-coupled state and configured to disengage from the probe when the rapid-connect coupling apparatus is in a coupled state.

7. The rapid-connect coupling apparatus of claim 6, wherein the plurality of latch segments are configured to grip the fuel tank receiving connector.

8. A rapid-connect coupling apparatus for coupling a fuel source coupling to a fuel tank receiving connector, comprising:

a housing defining, at least in part, a probe cavity;

a probe configured to translate within the probe cavity;

a latch assembly pivotably coupled to the housing, wherein the latch assembly is configured to pivot about a pivot point with respect to the housing based on a translation of the probe within the probe cavity; and a sleeve configured to cause a first latch end of the latch assembly to pivot and disengage from the probe as the sleeve translates about the housing, wherein the probe comprises a notch portion, and a second latch end of the latch assembly is configured to engage the notch portion after the first latch end disengages from the probe.

9. A rapid-connect coupling apparatus for coupling with a connector, comprising:

a housing defining a probe cavity;

a probe comprising one or more inner surfaces that define a closed perimeter of a fluid passageway, the one or more inner surfaces being configured to translate within the probe cavity;

at least one latch segment having a first latch end disposed in contact with a first surface of the probe when the rapid-connect coupling apparatus is in a non-coupled state, the first surface of the probe being fixed with respect to the one or more inner surfaces of the probe that define the fluid passageway;

a sleeve configured to contact the at least one latch segment; and a check valve actuating apparatus disposed within a portion of the probe cavity and extending from a first end of the probe.

10. The rapid-connect coupling apparatus of claim 9, wherein the check valve actuating apparatus is removable via one end of the housing.

11. The rapid-connect coupling apparatus of claim 9, wherein the check valve actuating apparatus is biased by a spring and a portion of the check valve actuating apparatus is operable to retract within the probe.

12. The rapid-connect coupling apparatus of claim 9, wherein the check valve actuating apparatus is configured to be locked in a retracted position.

13. The rapid-connect coupling apparatus of claim 9, wherein each latch segment comprises a threaded portion at the first latch end.

14. A rapid-connect coupling apparatus for coupling with a connector, comprising:

a housing defining a probe cavity;

a probe comprising one or more inner surfaces that define a closed perimeter of a fluid passageway, the one or more inner surfaces being configured to translate within the probe cavity;

at least one latch segment having a first latch end disposed in contact with a first surface of the probe when the rapid-connect coupling apparatus is in a non-coupled state, the first surface of the probe being fixed with respect to the one or more inner surfaces of the probe that define the fluid passageway; and a sleeve configured to contact the at least one latch segment;

wherein each latch segment comprises a second latch end opposite the first latch end, and the second latch end is configured to engage a notch portion of the probe.

15. The rapid-connect coupling apparatus of claim 14, wherein the second latch end is configured to transition out of the notch portion as the probe translates within the probe cavity.

16. A rapid-connect coupling apparatus for coupling with a connector, comprising:

a housing defining a probe cavity;

a probe comprising one or more inner surfaces that define a closed perimeter of a fluid passageway, the one or more inner surfaces being configured to translate within the probe cavity;

at least one latch segment having a first latch end disposed in contact with a first surface of the probe when the rapid-connect coupling apparatus is in a non-coupled state, the first surface of the probe being fixed with respect to the one or more inner surfaces of the probe that define the fluid passageway;

a sleeve configured to contact the at least one latch segment; and a ball cam surrounding a portion of the probe within the probe cavity.

17. The rapid-connect coupling apparatus of claim 16, wherein the ball cam is configured to slide along the probe.

* * * * *

UNITED STATES PATENT AND TRADEMARK OFFICE
CERTIFICATE OF CORRECTION

PATENT NO. : 9,732,893 B2
APPLICATION NO. : 14/833762
DATED : August 15, 2017
INVENTOR(S) : Howard M. Konishi It is certified that error appears in the above-identified patent and that said Letters Patent is hereby corrected as shown below:

In the Specification

Column 8, Line 25, "refracted" should be changed to --retracted--.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*